US012730906B2

(12) United States Patent
Qi et al.

(10) Patent No.: US 12,730,906 B2
(45) Date of Patent: Sep. 8, 2026

(54) MEDIA DATA DECRYPTION METHOD AND DEVICE, COMPUTER DEVICE, AND STORAGE MEDIUM

(71) Applicant: UNILUMIN GROUP CO., LTD., Shenzhen (CN)

(72) Inventors: Feng Qi, Shenzhen (CN); Chengzhi Yu, Shenzhen (CN)

(73) Assignee: UNILUMIN GROUP CO., LTD., Shenzhen (CN)

(*) Notice: Subject to any disclaimer, the term of this patent is extended or adjusted under 35 U.S.C. 154(b) by 300 days.

(21) Appl. No.: 18/707,132

(22) PCT Filed: Jul. 29, 2022

(86) PCT No.: PCT/CN2022/108891

§ 371 (c)(1),
(2) Date: May 2, 2024

(87) PCT Pub. No.: WO2023/103413

PCT Pub. Date: Jun. 15, 2023

(65) Prior Publication Data

US 2026/0154426 A1 Jun. 4, 2026

(30) Foreign Application Priority Data

Dec. 10, 2021 (CN) ......................... 202111510831.X

(51) Int. Cl.
*G06F 21/60* (2013.01)
*G06F 21/64* (2013.01)
(Continued)

(52) U.S. Cl.
CPC ............ *G06F 21/60* (2013.01); *G06F 21/602* (2013.01); *G06F 21/64* (2013.01);
(Continued)

(58) Field of Classification Search
CPC ......... H04L 9/32; H04L 9/3239; H04L 63/04; H04L 63/0428; H04L 63/0478;
(Continued)

(56) References Cited

U.S. PATENT DOCUMENTS 6,222,926 B1 * 4/2001 Cavallerano ........... H04N 7/167 348/E7.055
8,885,822 B2 * 11/2014 Jacob ................ H04N 21/2347 380/210

(Continued)

FOREIGN PATENT DOCUMENTS

CN 104680474 A 6/2015
CN 110248045 A 9/2019

(Continued)

OTHER PUBLICATIONS

International Search Report in International application No. PCT/CN2022/108891, mailed on Sep. 28, 2022.

(Continued)

*Primary Examiner* — Shaqueal D Wade-Wright
(74) *Attorney, Agent, or Firm* — PV IP PC; Wei Te Chung

(57) ABSTRACT

A media data decryption method includes: obtaining a media data encryption package, wherein the media data encryption package is obtained by performing pixel rearrangement encryption on original media data based on position index data, and the position index data correspond to one or more structural parameters of a display screen; decrypting the media data encryption package to obtain the position rearrangement index data and media data to be decrypted; configuring a programmable logic circuit of a control system of the display screen in a media data play terminal based on the position rearrangement index data; and decrypting the (Continued)

media data to be decrypted based on the configured programmable logic circuit to obtain decrypted media data.

12 Claims, 7 Drawing Sheets

(51) Int. Cl.
*H04N 21/2347* (2011.01)
*H04N 21/4405* (2011.01)
*G09G 3/00* (2006.01)
*H04L 9/32* (2006.01)
*H04L 9/40* (2022.01)

(52) U.S. Cl.
CPC ..... *H04N 21/2347* (2013.01); *H04N 21/4405* (2013.01); *G09G 3/007* (2013.01); *H04L 9/3239* (2013.01); *H04L 63/0428* (2013.01); *H04L 63/0478* (2013.01)

(58) Field of Classification Search
CPC ........ G06F 21/60; G06F 21/602; G06F 21/64; G09G 3/007; H04N 21/218; H04N 21/2347; H04N 21/4405; H04N 21/2351
See application file for complete search history.

(56) References Cited

U.S. PATENT DOCUMENTS 11,227,060 B1 * 1/2022 John .................... G06F 21/606
2008/0027973 A1 * 1/2008 Watanabe .............. G06F 16/78 707/999.102
2020/0099876 A1 3/2020 Shimada et al.
2023/0123207 A1 * 4/2023 McNutt ................ H04L 9/0872 713/167

FOREIGN PATENT DOCUMENTS

CN 110598430 A 12/2019
CN 111832035 A 10/2020
CN 112272262 A 1/2021
CN 114337988 A 4/2022
RU 2749496 C2 6/2021

OTHER PUBLICATIONS

Written Opinion of the International Search Authority in International application No. PCT/CN2022/108891, mailed on Sep. 28, 2022.
European Office Action issued in corresponding European Patent Application No. 22902847.7 dated Oct. 29, 2025, pp. 1-7.

* cited by examiner

| column \ row | 0 | 1 | 2 | 3 |
|---|---|---|---|---|
| 0 | 1 | 2 | 3 | 4 |
| 1 | 5 | 6 | 7 | 8 |
| 2 | 9 | 10 | 11 | 12 |
| 3 | 13 | 14 | 15 | 16 |

4*4 sequential display pixels

| column \ row | 0 | 1 | 2 | 3 |
|---|---|---|---|---|
| 0 | 4 | 8 | 11 | 2 |
| 1 | 16 | 15 | 5 | 7 |
| 2 | 13 | 1 | 12 | 14 |
| 3 | 10 | 6 | 9 | 3 |

4*4 rearranged display pixels

| column \ row | 0 | 1 | 2 | 3 |
|---|---|---|---|---|
| 0 | 2, 1 | 0, 3 | 3, 3 | 0, 0 |
| 1 | 1, 2 | 3, 1 | 1, 3 | 0, 1 |
| 2 | 3, 2 | 3, 0 | 0, 2 | 2, 2 |
| 3 | 2, 0 | 2, 3 | 1, 1 | 1, 0 |

position rearrangement index table

FIG. 3

MEDIA DATA DECRYPTION METHOD AND DEVICE, COMPUTER DEVICE, AND STORAGE MEDIUM

CROSS-REFERENCE TO RELATED APPLICATIONS

This application is a US national phase application based upon an International Application No. PCT/CN2022/108891, filed on Jul. 29, 2022, which claims priority to the Chinese patent application NO. 202111510831X, filed on Dec. 10, 2021. The disclosure of the aforementioned applications is incorporated herein by reference in their entireties.

TECHNICAL FIELD

The present disclosure relates to the field of data decryption, and in particular, to a media data decryption method and device, a computer device, and a storage medium.

BACKGROUND

With the vigorous development of the Light Emitting Diode (LED) display industry, the application fields of LED displays are becoming wider and wider. As an important means of media carrier, display screens are increasingly recognized by the market. With the in-depth development of smart city construction, display screens have become more intelligent and convenient, and can be controlled remotely as long as there is a network. While technology development brings convenience to large-screen managers, it also brings information security risks. Therefore, methods for encrypting and decrypting media data have emerged.

However, the inventors have realized that traditional media data decryption algorithms basically use common decryption algorithms to decrypt media information, and at the same time, different authentication methods are used correspondingly for a play control, while the display subsystem still maintains an original point-by-point mapping mode. In this way, after an underlying operating system of a play control device is invaded or controlled, regardless of being authorized or not, the media data may still be projected to the display screen through a hardware mapping mode.

It can be seen that the traditional media data decryption methods have a problem of low information security.

SUMMARY

According to various embodiments of the present disclosure, a media data decryption method and device, a computer device, and a storage medium are provided.

A media data decryption method includes:

obtaining a media data encryption package, wherein the media data encryption package is obtained by performing pixel rearrangement encryption on original media data based on position index data, and the position index data correspond to one or more structural parameters of a display screen;

decrypting the media data encryption package to obtain position rearrangement index data and media data to be decrypted;

configuring a programmable logic circuit of a control system of the display screen in a media data play terminal based on the position rearrangement index data; and decrypting the media data to be decrypted based on the configured programmable logic circuit to obtain decrypted media data.

A media data decryption device includes:

a data obtaining module configured to obtain a media data encryption package, wherein the media data encryption package is obtained by performing pixel rearrangement encryption on original media data based on position index data, and the position index data correspond to one or more structural parameters of a display screen;

a first data decryption module configured to decrypt the media data encryption package to obtain the position rearrangement index data and media data to be decrypted;

a circuit configuration module configured to configure a programmable logic circuit of a control system of the display screen in a media data play terminal based on the position rearrangement index data; and a second data decryption module configured to decrypt the media data to be decrypted based on the configured programmable logic circuit to obtain decrypted media data.

A computer device including a memory and one or more processors, wherein the memory stores computer readable instructions, which when executed by the one or more processors, causes the one or more processors to perform the following operations:

obtaining a media data encryption package, wherein the media data encryption package is obtained by performing pixel rearrangement encryption on original media data based on position index data, and the position index data correspond to one or more structural parameters of a display screen;

decrypting the media data encryption package to obtain the position rearrangement index data and media data to be decrypted;

configuring a programmable logic circuit of a control system of the display screen in a media data play terminal based on the position rearrangement index data; and decrypting the media data to be decrypted based on the configured programmable logic circuit to obtain decrypted media data.

One or more computer storage media stores computer readable instructions, wherein when executed by one or more processors, the computer readable instructions cause the one or more processors to perform the following operations:

obtaining a media data encryption package, wherein the media data encryption package is obtained by performing pixel rearrangement encryption on original media data based on position index data, and the position index data correspond to one or more structural parameters of a display screen;

decrypting the media data encryption package to obtain the position rearrangement index data and media data to be decrypted;

configuring a programmable logic circuit of a control system of the display screen in a media data play terminal based on the position rearrangement index data; and decrypting the media data to be decrypted based on the configured programmable logic circuit to obtain decrypted media data.

Details of one or more embodiments of the present disclosure will be put forward in the following drawings and the descriptions. Other features and advantages will be obvious from the specification, the drawings, and the claims.

BRIEF DESCRIPTION OF THE DRAWINGS

To more clearly illustrate the technical solutions in embodiments of the present application, the drawings required to be used in the embodiments will be briefly introduced below. It is apparent that the drawings in the following descriptions are only some embodiments of the present disclosure. Those of ordinary skill in the art can obtain other drawings based on these drawings without exerting creative efforts.

FIG. 3 is a schematic diagram of a process of obtaining position rearrangement index data in an embodiment.

DETAILED DESCRIPTION

To make the technical solutions and advantages of embodiments of the present disclosure clearer, the present disclosure will be further described in detail below with reference to the drawings and embodiments. It should be understood that the specific embodiments described here are only used to explain the present disclosure and are not used to limit the present disclosure.

Figure 1:
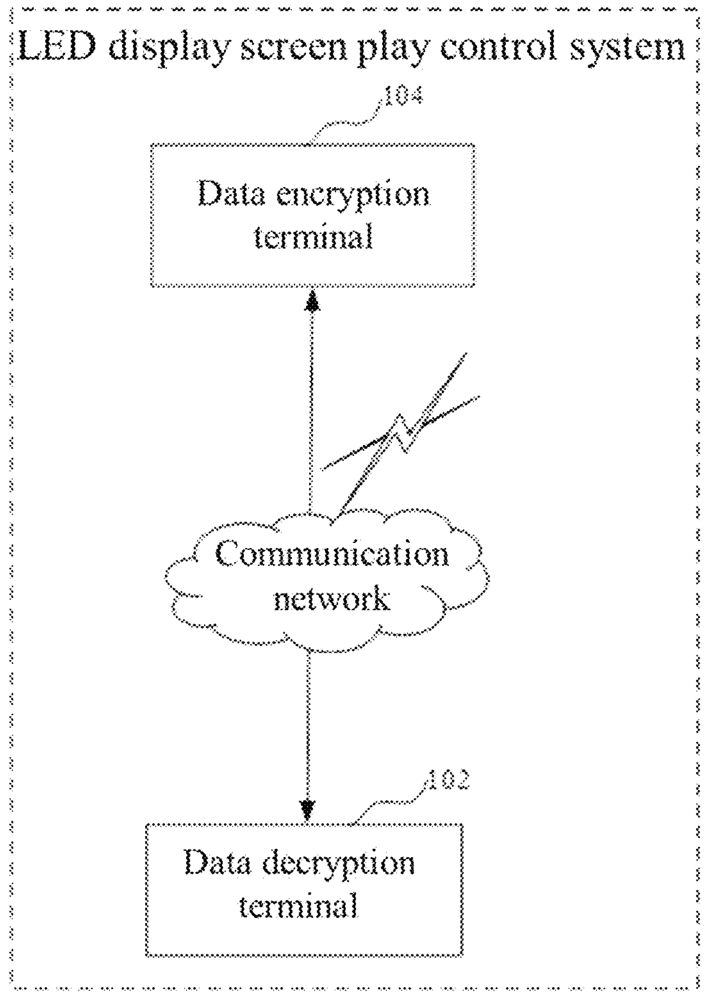
FIG. 1 is a schematic diagram of an LED display screen play control system in an embodiment.

Media data decryption methods provided by the present disclosure can be applied in an application environment as shown in FIG. 1. In a light-emitting diode (LED) display screen play control system, a data encryption terminal 102 and a data decryption terminal 104 communicate with each other through a network. Specifically, the data encryption terminal 102 may send a media data encryption package to the data decryption terminal 104. The media data encryption package is obtained by performing pixel rearrangement encryption on original media data based on position index data. The position index data correspond to one or more structural parameters of a display screen. The data decryption terminal 104 obtains the media data encryption package; decrypts the media data encryption package to obtain position rearrangement index data and media data to be decrypted; configures a programmable logic circuit of a control system of the display screen in a media data play terminal based on the position rearrangement index data; and decrypts the media data to be decrypted based on the configured programmable logic circuit to obtain decrypted media data. The data encryption terminal 102 includes but is not limited to an encryption and encoding engine. The data decryption terminal 104 includes but is not limited to a receiving card.

Figure 2:
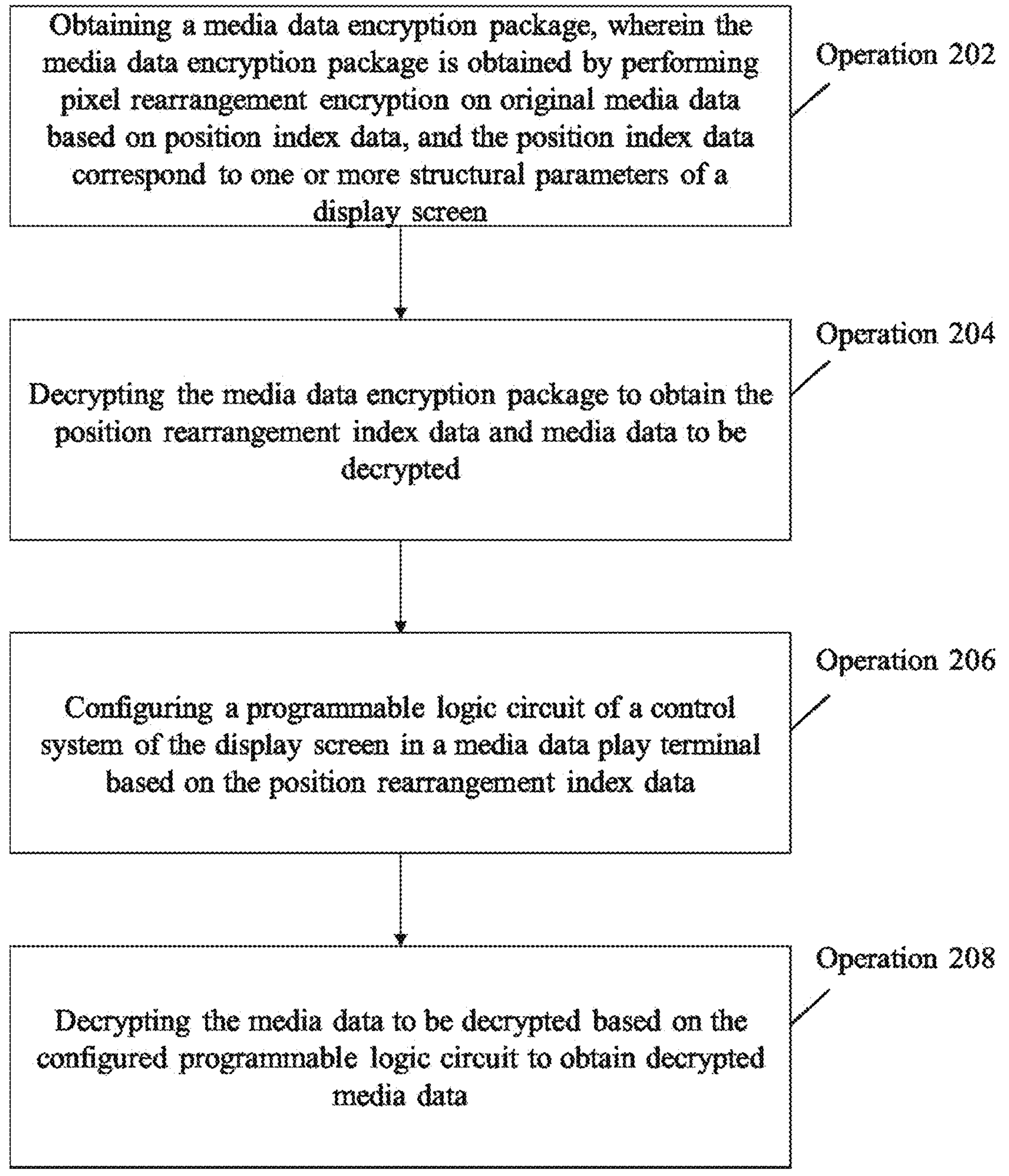
FIG. 2 is a schematic flow chart of a media data decryption method in an embodiment.

In one embodiment, as shown in FIG. 2, a media data decryption method is provided. For explanation, the method is applied to the data decryption terminal in FIG. 1 as an example, and includes the following operations.

In operation 202, a media data encryption package is obtained. The media data encryption package is obtained by performing pixel rearrangement encryption on original media data based on position index data. The position index data correspond to one or more structural parameters of a display screen.

In this embodiment, as an example, an external screen driven by the data decryption terminal is an LED display screen. A screen body of the LED display screen is composed of cabinets, and a cabinet is composed of modules. Therefore, the structural parameters of the display screen in this embodiment include an LED module dot matrix scale, an LED cabinet dot matrix scale, and an LED screen dot matrix scale. The media data encryption package is obtained through encryption by the data encryption terminal. A specific encryption process may be: obtaining media data to be encrypted and the structural parameters of the display screen of a media data play terminal, wherein the structural parameters of the display screen includes a module dot matrix scale, a cabinet dot matrix scale, and a screen dot matrix scale; constructing a module data arrangement table (also referred to as a module model) corresponding to the module dot matrix scale based on the module dot matrix scale; constructing a cabinet data arrangement table (also referred to as a cabinet model) corresponding to the cabinet dot matrix scale based on the cabinet dot matrix scale; constructing a screen data arrangement table (also referred to as a screen model) corresponding to the screen dot matrix scale based on the screen dot matrix scale; performing rearrangement operations on the module data arrangement table, the cabinet data arrangement table, and the screen data arrangement table, respectively, to obtain module-level position rearrangement index data (e.g., a module-level position rearrangement index table), cabinet-level position rearrangement index data (e.g., a cabinet-level position rearrangement index table), and screen-level position rearrangement index data (e.g., a screen-level position rearrangement index table), wherein position rearrangement index data represents a mapping relationship between a logical position and a physical position of a pixel of the display screen; dividing each frame of image of the media data to be encrypted into image blocks whose size is proportional to the module dot matrix scale of the display screen; performing a pixel rearrangement operation on the image blocks based on the module-level position rearrangement index data to obtain a module-level pixel rearrangement encryption result; performing pixel arrangement and combination on the module-level pixel rearrangement encryption result based on the cabinet-level position rearrangement index data to obtain a cabinet-level pixel rearrangement encryption result; performing pixel arrangement and combination on the cabinet-level pixel rearrangement encryption result based on the screen-level position rearrangement index data to obtain a screen-level pixel rearrangement encryption result; accumulating the screen-level pixel rearrangement encryption result corresponding to each frame of image in the media data to be encrypted to obtain encrypted media data. Specifically, the module model, the cabinet model, and the screen model of the LED display system may be obtained through a pixel point-plotting table, a cabinet data arrangement table, and a cabinet line-connection plot. Specifically, the pixel point-plotting table includes a logical relationship between LED display pixels and a driving circuit, the cabinet data arrangement table includes a relative relationship between each module and output data of the receiving card, and the cabinet line-connection plot includes a connection relationship between each cabinet and the display screen.

How the data encryption terminal encrypts the media data to be transmitted to obtain the media data encryption package is described hereinafter in combination with an embodiment. By way of example, the LED display screen is an LED screen composed of 4 (horizontal)*3 (height) cabinets, each cabinet is a 96*96 dot cabinet composed of 32*32 dot matrix modules, the position rearrangement index data is a position rearrangement index table, and a process for obtaining the media data encryption package may be as below.

An operator imports the video data to be encrypted and the structural parameters (including a 32*32 module dot matrix scale, a 3*3 cabinet dot matrix scale, and a 4*3 screen dot matrix scale) of the LED display screen of a video play terminal into the data encryption terminal, and sends a data encryption instruction. In response to the data encryption instruction, a processor of the data encryption terminal constructs a 32*32 module model (32*32 matrix), a 3*3 cabinet model (3*3 matrix), and a 4*3 screen model (4*3 matrix) based on the 32*32 dot matrix module, the 3*3 dot matrix cabinet, and the 4*3 dot matrix screen, respectively; performs the rearrangement operations on the 32*32 module model, the 3*3 cabinet model, and the 4*3 screen model based on a shuffle algorithm to obtain a rearranged module model, a rearranged cabinet model, and a rearranged screen model; and analyses the module models, the cabinet models, and the screen models before and after the rearrangement operations to obtain a module-level position rearrangement index table, a cabinet-level position rearrangement index table, and a screen-level position rearrangement index table.

Then, the module-level position rearrangement index table is used to divide each frame of image in the video data into 32*32-point-size image blocks in sequence (from top to bottom, from left to right) to obtain a plurality of image blocks. Then, the pixel rearrangement operation is performed on each image block to obtain a new rearranged image block, thereby obtaining a module-level position rearrangement encryption result. Further, the module-level position rearrangement index table may be encrypted and saved. The pixel arrangement and combination are performed on the module-level encryption result based on the 3*3 cabinet-level position rearrangement index table, to obtain a cabinet-level position rearrangement encryption result. Similarly, the cabinet-level position rearrangement index table may be encrypted and saved. Finally, the pixel arrangement and combination are performed on the cabinet-level position rearrangement encryption result based on the 4*3 screen-level pixel position rearrangement index table to obtain a screen-level position rearrangement encryption result. Also, the screen-level position rearrangement index table may be encrypted, and saved. At this point, an encryption result of a single frame of image is obtained through the above processing. Through the above processing, entire video data may be encrypted frame by frame, and the screen-level pixel rearrangement encryption result corresponding to each single frame of image are accumulated to obtain encrypted video data, which are stored as data files. Further, a Message-Digest Algorithm 5 (MD5) is used to perform an MD5 operation on the encrypted video data to generate an MD5 verification code. Then, the module-level position rearrangement index data, the cabinet-level position rearrangement index data, the screen-level position rearrangement index data, the encrypted video data, and the MD5 verification code are packaged to obtain the media data encryption package. The media data encryption package may be sent to the media data play terminal through a content distribution network or a file transfer protocol.

In operation 204, the media data encryption package is decrypted to obtain the position rearrangement index data and the media data to be decrypted.

When the media data encryption package is obtained, a decryption algorithm may be used to perform first-level decryption on the media data encryption package to obtain the position rearrangement index data and the video data to be decrypted. In a specific application, if the media data encryption package has one file, the file may be divided according to the file name into a position rearrangement index file and a media data file. If the media data encryption package has split files including a position rearrangement index file and a media data file, which may be directly decrypted to obtain the position rearrangement index file and the media data file to be decrypted. The position rearrangement index data is obtained by performing the rearrangement operation on the data arrangement table. Taking a position rearrangement index table as an example, a unit value in the table is a storage position of an element (which element is one of the data arrangement table before the rearrangement operation) in a rearranged data arrangement table. As shown in FIG. 3, if a random rearrangement operation is performed on a 4*4 pixel arrangement table (wherein different table cells represent different pixel information) to obtain a rearranged pixel arrangement table, a 4*4 position rearrangement index table may be obtained by comparing the pixel arrangement table before the rearrangement operation and the rearranged pixel arrangement table. It can be understood that the rearrangement operation on the original sequential data arrangement table corresponds to (4*4)!−1 arrangements (excluding the sequential arrangement), and correspondingly (4*4)!−1 position rearrangement index tables may be obtained. In the embodiment, the rearranged data arrangement table may be restored to the original sequence arrangement table. In this way, in a subsequent image decryption process, based on the position rearrangement index table, a rearranged image may be restored to a sequential image.

Following the above embodiment, at this time, the decrypted position rearrangement index data should include the module-level position rearrangement index table, the cabinet-level position rearrangement index table, and the screen-level position rearrangement index table.

In operation 206, a programmable logic circuit of a control system of the display screen in the media data play terminal is configured based on the position rearrangement index data.

In this embodiment, the control system of the display screen is for example a control system of a standalone LED display screen. The control system of the LED display screen is for example a system that controls a correct display of a LED large screen according to user needs. The control system of the standalone LED display screen is also known as an LED display controller, an LED display control card, which is a core component of the LED display and is mainly responsible for converting an external video input signal or an onboard multimedia file into a digital signal that is easily identifiable for the LED large screen to light up the LED large screen, similar to a graphic card in a home computer. The configuration of the programmable logic circuit of the control system of the display screen in the media data play terminal is to configure the programmable logic circuit of the control system of the LED display screen. A specific configuration may be: converting the obtained position rearrangement index table into a machine-recognizable language such as hexadecimal ASCII code, and then configuring the programmable logic circuit in the control system of the LED display screen.

In operation 208, the media data to be decrypted is decrypted based on the configured programmable logic circuit to obtain decrypted media data.

After completing the configuration of the programmable logic circuit in the control system of the LED display, since the pixel point-plotting table and the module model construct an inverse function relationship, the cabinet data arrangement table and the cabinet model construct an inverse function relationship, and the cabinet line-connection format data (e.g., the cabinet line-connection plot) and the screen model construct an inverse function relationship, encrypted and rearranged pixel information may be initialized in sequence into the cabinet line-connection format data, the cabinet data arrangement table, and the pixel point-plotting table in a memory of the receiving card, and may undergo reverse hardware real-time mapping and decoding one by one to complete a real-time decryption process, thus restoring the rearranged video data to the sequential video data. Specifically, in this embodiment, a data initialization method includes a RAP initialization method, an RCP initialization method, or an RSP initialization method. Since an LED information display system can support logical-physical positions remapping of an LED display pixel through the position rearrangement index table, the rearranged image information may be restored to the sequential image information by creating a lookup table, thereby realizing logical implementation of an image information decryption process. Based on the created lookup table and according to a pixel position table encoding format, a unique pixel rearrangement index table corresponding to the encoded video data may be generated, and then the rearranged image information may be restored to the sequential image information.

In the above media data decryption method, the programmable logic circuit of the control system of the display screen in the media data play terminal is configured according to the position rearrangement index data corresponding to the structural parameters of the display screen, so that the configured programmable logic circuit corresponds to the structure of the LED screen, thus realizing a decryption that is only performed when both the real-time decryption capability of hardware of the play terminal and the corresponding relationship between the programmable logic circuit and the structure of the LED screen are available in the decryption process. Moreover, since there are a huge range of possible encryption results of the media data, which may be generated based on the position rearrangement index data through rearrangement and encryption, there is no way for attackers to crack the encryption, thereby fully ensuring information security of the media data.

Figure 4:
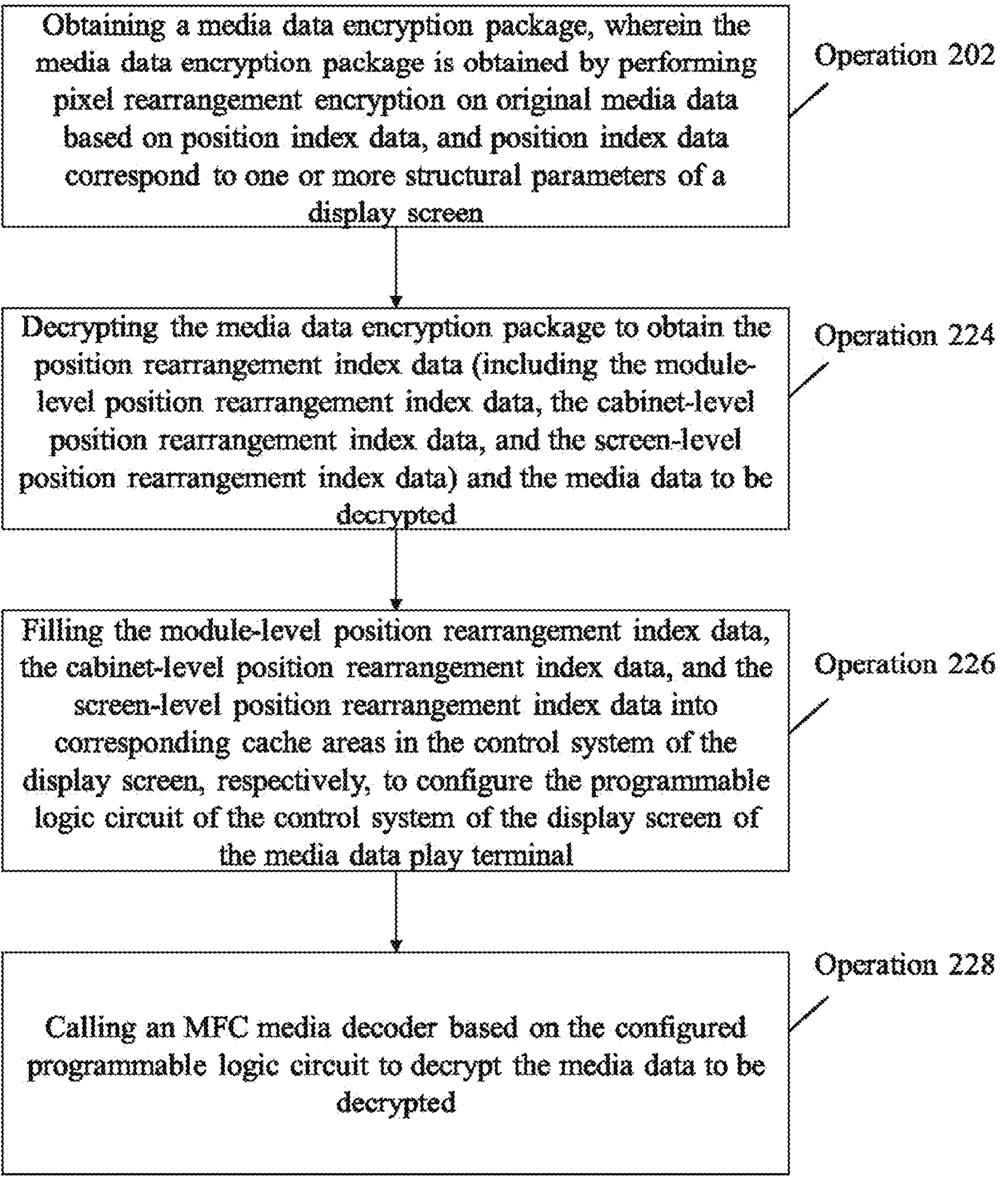
FIG. 4 is a detailed flow chart of a media data decryption method in an embodiment.

As shown in FIG. 4, in one embodiment, the structural parameters of the display screen include the module dot matrix scale, the cabinet dot matrix scale, and the screen dot matrix scale of the display screen. The position index data are obtained through the structural parameters of the display screen and represent the mapping relationship between the logical and physical positions of the display pixel of the display screen. The position rearrangement index data includes the module-level position rearrangement index data, the cabinet-level position rearrangement index data, and the screen-level position rearrangement index data.

The operation 204 includes: in operation 224, decrypting the media data encryption package to obtain the position rearrangement index data (including the module-level position rearrangement index data, the cabinet-level position rearrangement index data, and the screen-level position rearrangement index data) and the media data to be decrypted. The operation 206 includes: in operation 226, filling the module-level position index data, the cabinet-level position index data, and the screen-level position index data into corresponding cache areas in the control system of the display screen, respectively, to configure the programmable logic circuit of the control system of the display screen of the media data play terminal.

Specifically, the position rearrangement index data obtained through the decryption includes the module-level position rearrangement index data, the cabinet-level position rearrangement index data, and the screen-level position rearrangement index data. The memory of the receiving card of the control system of the LED display screen is preset with three corresponding areas for storing the module-level position rearrangement index data, the cabinet-level position rearrangement index data, and the screen-level position rearrangement index data. The configuration of the programmable logic circuit may be: filling the module-level position index data, the cabinet-level position index data, and the screen-level position index data into the corresponding areas in the memory of the receiving card (i.e., a random access memory (RAM) of the receiving card) of the control system of the LED display screen, respectively, and then performing data initialization to complete the configuration of the programmable logic circuit. Furthermore, since the RAM has the characteristic of data loss during power failure, to correctly initialize the programmable logic on the receiving card, a microprogrammed control unit (MCU) on the receiving card will verify the configuration data, and then transfer and store it to a non-volatile FLASH memory on the card as a backup. In solutions of the present application, since the above-mentioned three mathematical models such as the pixel point-plotting table, the cabinet data arrangement table, and the cabinet line-connection plot need to be mixed during the encryption and the decryption. Therefore, there is no need to save relevant information on the receiving card. Even if relevant information is stored in the RAM during use, it needs to be cleared regularly through a firmware operation. In this embodiment, the above configuration method may realize orderly decryption of encrypted and rearranged video data.

As shown in FIG. 4, in one embodiment, the operation 208 includes: in operation 228, calling a Multi Format Codec (MFC) media decoder based on the configured programmable logic circuit to decrypt the media data to be decrypted.

Specifically, the MFC media decoder may be called based on the configured programmable logic circuit to efficiently decode the video data to be decrypted. It can be understood that in other embodiments, other types of media decoders may be used for decoding, depending on the format of the media data to be decrypted, which is not limited here.

Figure 5:
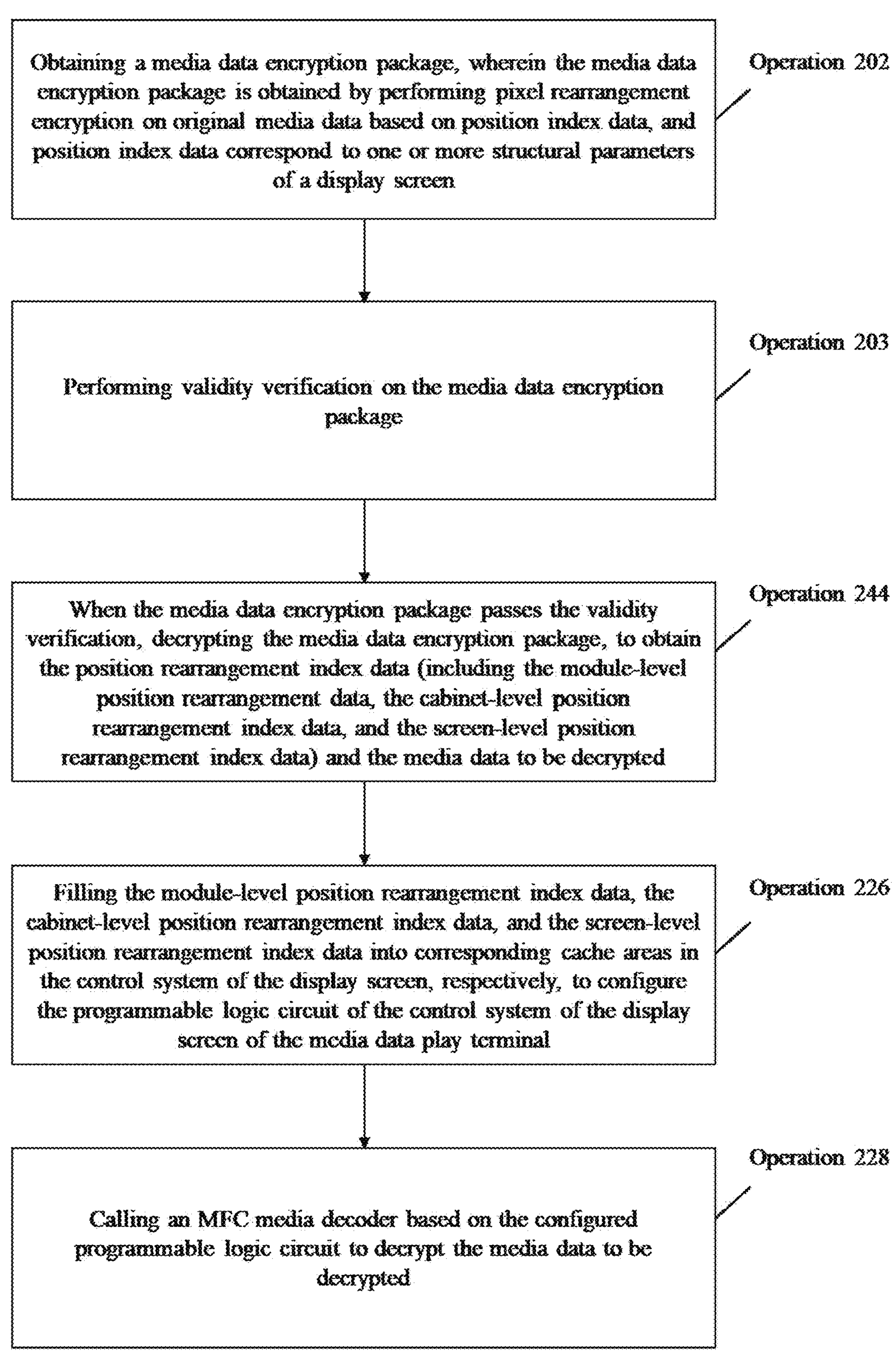
FIG. 5 is a detailed flow chart of a media data decryption method in another embodiment.

As shown in FIG. 5, in one embodiment, before decrypting the media data encryption package, the method further includes: in operation 203, performing validity verification on the media data encryption package. The operation 224 includes: in operation 244, when the media data encryption package passes the validity verification, decrypting the media data encryption package, to obtain the position rearrangement index data (including the module-level position rearrangement data, the cabinet-level position rearrangement index data, and the screen-level position rearrangement index data) and the media data to be decrypted.

To prevent the media data encryption package from being intercepted and tampered by an attacker during transmission, the media data encryption package may be checked for its validity. If the media data encryption package passes the validity verification, it proves that data integrity and correctness of the media data encryption package is not tampered. At this time, the media data encryption package is to be decrypted. In this embodiment, performing the validity verification before decrypting the media data encryption package may further ensure correct and safe display of the media data.

In one embodiment, the media data encryption package carries a first verification code. The validity verification on the media data encryption package includes: performing a hash operation on the media data encryption package to generate a second verification code; and determining whether the second verification code matches the first verification code, to perform the validity verification on the media data encryption package.

In this embodiment, the verification code is for example a message-digest algorithm 5 (MD5) verification code. The media data encryption package carries the first MD5 verification code. After the media data encryption package is obtained, an MD5 operation may be performed on the media data encryption package to obtain the second MD5 verification code, and then the first MD5 verification code and the second MD5 verification code is compared to determine whether the second MD5 verification code matches the first MD5 verification code. If they match each other, it proves that the media data encryption package has not been tampered with. Otherwise, it indicates that the media data encryption package has been tampered with. In this way, the validity of the media data encryption package may be simply and effectively verified through matching verification codes.

To provide a clearer explanation of the media data decryption method provided by the present application, the method is explained in conjunction with a specific embodiment hereinafter.

The data encryption terminal sends the media data encryption package carrying the media data to be decrypted, the position rearrangement index data, and the first MD5 verification code to the data decryption terminal. After receiving the media data encryption package, the receiving card of the data decryption terminal may perform the MD5 operation on the media data encryption package to obtain the second MD5 verification code, and compare the first MD5 code and the second MD5 code to determine whether they are matched. If matched, it proves that the media data encryption package has not been tampered with, and the receiving card of the data decryption terminal may perform a first level decryption on the media data encryption package through a decryption algorithm to obtain the position rearrangement index data (including module-level position rearrangement index data, cabinet-level position rearrangement index data, and screen-level position rearrangement index data) and the media data to be decrypted, fill the position rearrangement index data in the corresponding areas in the RAM of the receiving card, and then perform the data initialization, to complete the configuration of the programmable logic circuit. Finally, based on the configured programmable logic circuit, the MFC media decoder is called to decode and play the pixel rearrangement video data.

It should be understood that although the operations in the flowcharts of FIGS. 2, 4, and 5 are shown in sequence as indicated by arrows, these operations are not necessarily executed in the order indicated by arrows. Unless explicitly stated in the present disclosure, there is no strict order limitation on the execution of these operations, and these operations can be executed in other orders. Moreover, at least some of the operations in FIGS. 2, 4, and 5 may include multiple sub-operations or multiple stages. These sub-operations or stages are not necessarily executed at the same time, but may be executed at different times. The execution order of these sub-operations or stages is not necessarily sequential, but may be performed in turn or alternately with other operations, sub-operations of other operations, or at least part of the stages.

Figures 6, 7:
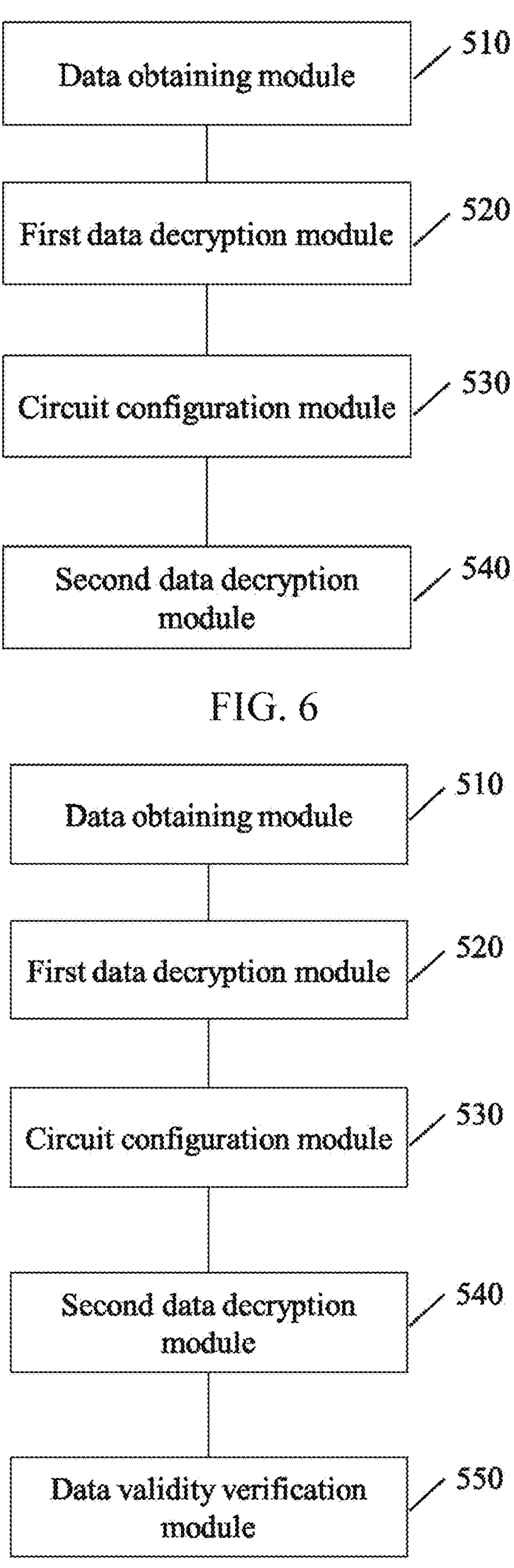
FIG. 6 is a structural block diagram of a media data decryption device in an embodiment.
FIG. 7 is a structural block diagram of a media data decryption device in another embodiment.

In one embodiment, as shown in FIG. 6, a media data decryption device is provided, including: a data obtaining module 510, a first data decryption module 520, a circuit configuration module 530, and a second data decryption module 540.

The data obtaining module 510 is configured to obtain a media data encryption package, wherein the media data encryption package is obtained by performing pixel rearrangement encryption on original media data based on position index data, and the position index data correspond to one or more structural parameters of a display screen.

The first data decryption module 520 is configured to decrypt the media data encryption package to obtain the position rearrangement index data and media data to be decrypted.

The circuit configuration module 530 is configured to configure a programmable logic circuit of a control system of the display screen based on the position rearrangement index data.

The second data decryption module 540 is configured to decrypt the media data to be decrypted based on the configured programmable logic circuit to obtain decrypted media data.

The above-mentioned media data decryption device configures the programmable logic circuit of the control system of the display screen in the media data play terminal according to the position rearrangement index data corresponding to the structural parameters of the display screen, so that the configured programmable logic circuit corresponds to the structure of the LED screen, thus realizing a decryption which is only performed when both the real-time decryption capability of hardware of the play terminal and the corresponding relationship between the programmable logic circuit and the structure of the LED screen are available in the decryption process. Moreover, since there are many possible encryption results of the media data, which are generated based on the position rearrangement index data through rearrangement and encryption, there is no possibility for attackers to crack, thereby fully ensuring information security of the media data.

In one embodiment, the structural parameters of the display screen include the module dot matrix scale, the cabinet dot matrix scale, and the screen dot matrix scale of the display screen. The position index data are obtained through the structural parameters of the display screen and represent the mapping relationship between the logical and physical positions of the display pixel of the display screen. The position rearrangement index data includes the module-level position rearrangement index data, the cabinet-level position rearrangement index data, and the screen-level position rearrangement index data.

The circuit configuration module 530 is also configured to fill the module-level position rearrangement index data, the cabinet-level position rearrangement index data, and the screen-level position rearrangement index data into corresponding cache areas in the control system of the display screen, respectively, to configure the programmable logic circuit of the control system of the display screen in the media data play terminal.

In one embodiment, the second data decryption module 540 is also used to call an MFC media decoder based on the configured programmable logic circuit to decrypt the media data to be decrypted.

As shown in FIG. 7, in one embodiment, the device also includes: a data validity verification module 550 configured to perform validity verification on the media data encryption package. The first data decryption module 520 is further configured to decrypt the media data encryption package when the media data encryption package passes the validity verification.

In one embodiment, the media data encryption package carries a first verification code, and the data validity verification module 550 is further configured to perform a hash operation on the media data encryption package to generate a second verification code, and determine whether the second verification code matches the first verification code, to determine whether the media data encryption package passes the validity verification.

For specific limitations on the media data decryption device, please refer to the above limitations on the media data decryption method, which will not be repeated herein. Each module in the above media data decryption device can be implemented in whole or in part by software, hardware, or a combination thereof. Each of the above modules may be embedded in or independent of a processor of a computer device in the form of hardware, or may be stored in a memory of the computer device in the form of software, so that the processor can call and execute the operations corresponding to the above modules.

Figure 8:
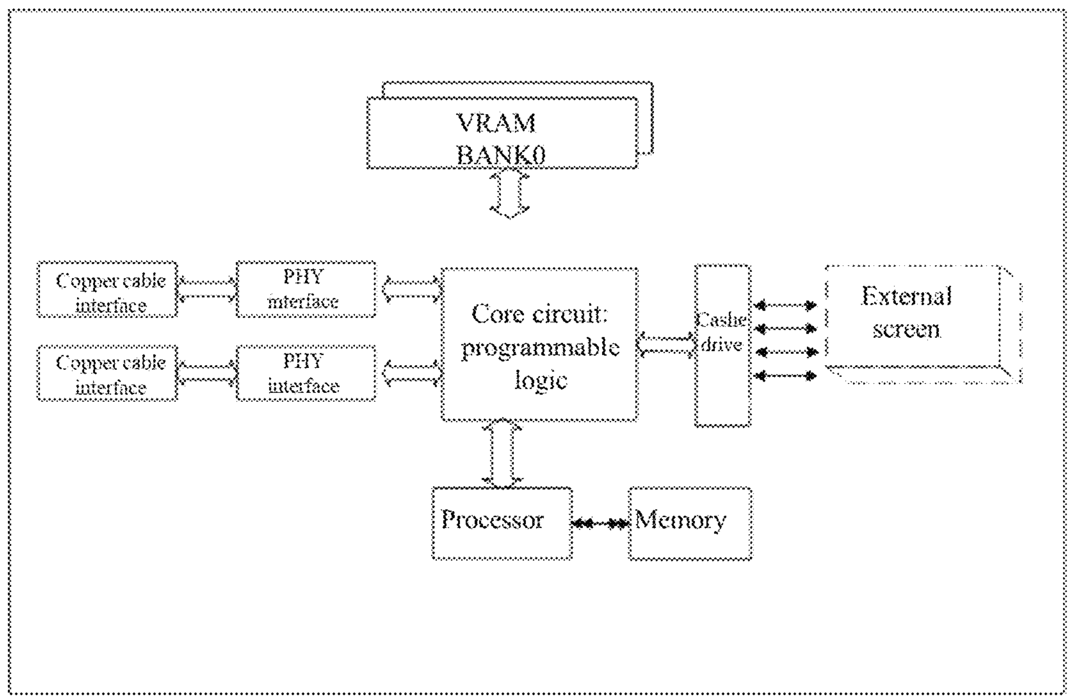
FIG. 8 is a diagram showing internal structure of a computer device in one embodiment.

In one embodiment, a computer device is provided. The computer device may be a data decryption device in an LED display screen play control system, and an internal structure diagram thereof may be as shown in FIG. 8. The computer device includes a programmable core circuit, a processor, a memory, a video random access memory (VRAM), a physical layer (PHY) interface, a copper cable interface, and the like, which are connected through a system bus. The processor of the computer device is configured to provide computing and control capabilities, including but not limited to a microprocessor ARM. The memory of the computer device includes a non-volatile storage medium and an internal memory. The non-volatile storage medium may be a FLASH memory. The non-volatile storage medium stores an operating system, a computer readable instruction, etc. The internal memory provides an environment for the execution of the operating system and the computer-readable instruction in the non-volatile storage medium. The PHY interface of the computer device is used to communicate with an external terminal through a network connection. The computer-readable instruction, when executed by the processor, implements a media data decryption method.

Those skilled in the art can understand that the structure shown in FIG. 8 is only a block diagram of a partial structure related to a solution of the present application, and does not constitute a limitation on the computer device to which the solution of the present application is applied. A specific computer device may include more or fewer components than components as shown, combine some of the components, or have a different arrangement of parts.

A computer device includes a memory and one or more processors. The memory stores computer-readable instructions. When executed by the processor, the computer-readable instructions cause the one or more processors to perform the following operations: obtaining a media data encryption package, wherein the media data encryption package is obtained by performing pixel rearrangement encryption on original media data based on position index data, and the position index data correspond to one or more structural parameters of a display screen; decrypting the media data encryption package to obtain the position rearrangement index data and media data to be decrypted; configuring a programmable logic circuit of a control system of the display screen based on the position rearrangement index data; and decrypting the media data to be decrypted based on the configured programmable logic circuit to obtain decrypted media data.

In one embodiment, the structural parameters of the display screen include a module dot matrix scale, a cabinet dot matrix scale, and a screen dot matrix scale of the display screen. The position index data is obtained through the structural parameters of the display screen and represents a mapping relationship between a logical position and a physical position of each of the display pixels of the display screen. The position rearrangement index data includes module-level position rearrangement index data, cabinet-level position rearrangement index data, and screen-level position rearrangement index data.

When executing the computer-readable instructions, the processors may further implement the following operations: filling the module-level position rearrangement index data, the cabinet-level position rearrangement index data, and the screen-level position rearrangement index data into corresponding cache areas in the control system of the display screen, respectively, to configure the programmable logic circuit of the control system of the display screen at a media data display terminal.

In one embodiment, when executing the computer-readable instructions, the processors may further implement the following operations: calling an MFC media decoder based on the configured programmable logic circuit to decrypt the media data to be decrypted.

In one embodiment, when executing the computer-readable instructions, the processors may further implement the following operations: performing validity verification on the media data encryption package, and when the media data encryption package passes the validity verification, decrypting the media data encryption package.

In one embodiment, the media data encryption package carries a first verification code, and when executing the computer-readable instructions, the processors may further implement the following operations: performing a hash operation on the media data encryption package to generate a second verification code; and when the second verification code matches the first verification code, determining that the media data encryption package passes the validity verification.

In one embodiment, the media data encryption package carries a first MD5 code, and when executing the computer-readable instructions, the processors may further implement the following operations: performing a hash operation on the media data encryption package to generate a second MD5 code; and when the second MD5 code matches the first MD5 code, determining that the media data encryption package passes the validity verification.

One or more computer storage media stores computer-readable instructions that, when executed by one or more processors, cause the one or more processors to perform the following operations: obtaining a media data encryption package, wherein the media data encryption package is obtained by performing pixel rearrangement encryption on original media data based on position index data, and the position index data correspond to one or more structural parameters of a display screen; decrypting the media data encryption package to obtain the position rearrangement index data and media data to be decrypted; configuring a programmable logic circuit of a control system of the display screen in the media data play terminal based on the position rearrangement index data; and decrypting the media data to be decrypted based on the configured programmable logic circuit to obtain decrypted media data.

The computer storage media is readable storage media, and the readable storage media may be non-volatile or volatile.

In one embodiment, the structural parameters of the display screen include a module dot matrix scale, a cabinet dot matrix scale, and a screen dot matrix scale of the display screen. The position index data is obtained through the structural parameters of the display screen and represents a mapping relationship between a logical position and a physical position of each of the display pixels of the display screen. The position rearrangement index data includes module-level position rearrangement index data, cabinet-level position rearrangement index data, and screen-level position rearrangement index data.

The computer readable instructions, when executed by the processor, further perform the following operations: filling the module-level position rearrangement index data, the cabinet-level position rearrangement index data, and the screen-level position rearrangement index data into corresponding cache areas in the control system of the display screen, respectively, to configure the programmable logic circuit of the control system of the display screen in the media data play terminal.

In one embodiment, the computer readable instructions, when executed by the processor, further perform the following operations: calling an MFC media decoder based on the configured programmable logic circuit to decrypt the media data to be decrypted.

In one embodiment, the computer readable instructions, when executed by the processor, further perform the following operations: performing validity verification on the media data encryption package, and when the media data encryption package passes the validity verification, decrypting the media data encryption package.

In one embodiment, the media data encryption package carries a first verification code, and the computer readable instructions, when executed by the processor, further perform the following operations: performing a hash operation on the media data encryption package to generate a second verification code; and when the second verification code matches the first verification code, determining that the media data encryption package passes the validity verification.

In one embodiment, the media data encryption package carries a first MD5 code, and the computer readable instructions, when executed by the processor, further perform the following operations: performing a hash operation on the media data encryption package to generate a second MD5 code; and when the second MD5 code matches the first MD5 code, determining that the media data encryption package passes the validity verification.

Those of ordinary skill in the art can understand that all or part of the processes in the methods of the above embodiments can be implemented by instructing relevant hardware through the computer readable instructions. The computer readable instructions can be stored in a non-volatile computer-readable storage medium. When executed, the computer-readable instructions may include the processes of the above method embodiments. Any reference to memories, database, or other media used in the embodiments provided in the present disclosure may include at least one of non-volatile and volatile memories. The non-volatile memories may include a read-only memory (ROM), a magnetic tape, a floppy disk, a flash memory, an optical memory, a high-density embedded non-volatile memory, a resistive Random Access Memory (ReRAM), a Magnetoresistive Random Access Memory (MRAM), a Ferroelectric Random Access Memory (FRAM), a Phase Change Memory (PCM), a graphene memory, etc. The volatile memory may include a Random Access Memory (RAM), an external cache memory, etc. As an illustration and not a limitation, the RAM can be in various forms, such as Static Random Access Memory (SRAM) or Dynamic Random Access Memory (DRAM). The processors involved in the various embodiments provided in the present disclosure may be general-purpose processors, central processing units, graphics processors, digital signal processors, programmable logic devices, quantum computing-based data processing logic devices, etc., and are not limited herein.

The technical features of the above embodiments can be combined in any way. To simplify the description, not all possible combinations of the technical features in the above embodiments are described. However, as long as there is no contradiction in the combination of these technical features, all possible combinations should be considered to be within the scope of the present disclosure.

The above-described embodiments only express several implementation ways of the present disclosure, and their descriptions are relatively specific and detailed, but should not be construed as limiting the scope of the present application. It should be noted that, for those of ordinary skill in the art, several modifications and improvements can be made without departing from the concept of the present application, and these all fall within the protection scope of the present application. Therefore, the protection scope of the present application should be determined by the appended claims.

What is claimed is:

1. A media data decryption method, comprising:

obtaining a media data encryption package, wherein the media data encryption package is obtained by performing pixel rearrangement encryption on original media data based on position index data, and the position index data correspond to one or more structural parameters of a display screen in a media data play terminal;

decrypting the media data encryption package to obtain position rearrangement index data and media data to be decrypted;

configuring a programmable logic circuit of a control system of the display screen in the media data play terminal based on the position rearrangement index data; and decrypting the media data to be decrypted based on the configured programmable logic circuit to obtain decrypted media data.

2. The media data decryption method according to claim 1, wherein the one or more structural parameters of the display screen comprise a module dot matrix scale, a cabinet dot matrix scale, and a screen dot matrix scale of the display screen, the position index data is obtained through the one or more structural parameters of the display screen and represents a mapping relationship between a logical position and a physical position of a display pixel of the display screen, the position rearrangement index data comprises module-level position rearrangement index data, cabinet-level position rearrangement index data, and screen-level position rearrangement index data, and the configuring of the programmable logic circuit of the control system of the display screen in the media data play terminal based on the position rearrangement index data comprises:

filling the module-level position rearrangement index data, the cabinet-level position rearrangement index data, and the screen-level position rearrangement index data into corresponding cache areas in the control system of the display screen, respectively, to configure the programmable logic circuit of the control system of the display screen in the media data play terminal.

3. The media data decryption method according to claim 1, wherein the decrypting of the media data to be decrypted based on the configured programmable logic circuit comprises:

calling a Multi Format Codec (MFC) media decoder based on the configured programmable logic circuit to decrypt the media data to be decrypted.

4. The media data decryption method according to claim 1, wherein before decrypting the media data encryption package, the method further comprises:

performing validity verification on the media data encryption package;

the decrypting of the media data encryption package comprises:

when the media data encryption package passes the validity verification, decrypting the media data encryption package.

5. The media data decryption method according to claim 4, wherein the media data encryption package carries a first verification code, and the performing of the validity verification on the media data encryption package comprises:

performing a hash operation on the media data encryption package to generate a second verification code; and when the second verification code matches the first verification code, determining that the media data encryption package passes the validity verification.

6. The media data decryption method according to claim 5, wherein the first verification code and the second verification code are both message-digest algorithm 5 (MD5) codes.

7. A computer device comprising a memory and one or more processors, wherein the memory stores computer readable instructions, which when executed by the one or more processors, causes the one or more processors to perform following operations:

obtaining a media data encryption package, wherein the media data encryption package is obtained by performing pixel rearrangement encryption on original media data based on position index data, and the position index data correspond to one or more structural parameters of a display screen in a media data play terminal;

decrypting the media data encryption package to obtain position rearrangement index data and media data to be decrypted;

configuring a programmable logic circuit of a control system of the display screen in the media data play terminal based on the position rearrangement index data; and decrypting the media data to be decrypted based on the configured programmable logic circuit to obtain decrypted media data.

8. The computer device according to claim 7, wherein the one or more structural parameters of the display screen comprise a module dot matrix scale, a cabinet dot matrix scale, and a screen dot matrix scale of the display screen, the position index data is obtained through the one or more structural parameters of the display screen and represents a mapping relationship between a logical position and a physical position of a display pixel of the display screen, the position rearrangement index data comprises module-level position rearrangement index data, cabinet-level position rearrangement index data, and screen-level position rearrangement index data, and when executing the computer readable instructions, the processors further perform the following operations:

filling the module-level position rearrangement index data, the cabinet-level position rearrangement index data, and the screen-level position rearrangement index data into corresponding cache areas in the control system of the display screen, respectively, to configure the programmable logic circuit of the control system of the display screen in the media data play terminal.

9. The computer device according to claim 7, wherein when executing the computer readable instructions, the processors further perform the following operations:

calling a Multi Format Codec (MFC) media decoder based on the configured programmable logic circuit to decrypt the media data to be decrypted.

10. The computer device according to claim 7, wherein when executing the computer readable instructions, the processors further perform the following operations:

performing validity verification on the media data encryption package; and when the media data encryption package passes the validity verification, decrypting the media data encryption package.

11. The computer device according to claim 10, wherein the media data encryption package carries a first verification code, and when executing the computer readable instructions, the processors further perform the following operations:

performing a hash operation on the media data encryption package to generate a second verification code; and when the second verification code matches the first verification code, determining that the media data encryption package passes the validity verification.

12. The computer device according to claim 10, wherein the media data encryption package carries a first message-digest algorithm 5 (MD5) code, and when executing the computer readable instructions, the processors further perform the following operations:

performing a hash operation on the media data encryption package to generate a second MD5 code; and when the second MD5 code matches the first MD5 code, determining that the media data encryption package passes the validity verification.

* * * * *